United States Patent
Hirschberg

[11] 3,889,345
[45] June 17, 1975

[54] METHOD AND APPARATUS FOR MANUFACTURE OF FLOOR GRATINGS

[75] Inventor: Walter Ivar Hirschberg, Laxa, Sweden

[73] Assignee: Elektriska Svetsningsaktiebolaget, Goteborg, Sweden

[22] Filed: Oct. 15, 1973

[21] Appl. No.: 406,149

[30] Foreign Application Priority Data
Oct. 16, 1972 Sweden.................. 13308/72

[52] U.S. Cl................. 29/412; 29/160; 29/33 S; 29/475; 83/423; 83/425.3; 226/197; 228/5
[51] Int. Cl............................................. B23p 17/00
[58] Field of Search....... 29/33 S, 412, 160, DIG. 3, 29/475, 471.1; 198/33; 226/197; 228/4, 5; 83/425, 423, 425.2, 425.3; 113/116 W, 116 Y, 116 BB, 1 N, 1 M

[56] References Cited
UNITED STATES PATENTS

| | | |
|---|---|---|
| 2,172,081 | 9/1939 | Fay et al.......................... 228/5 X |
| 2,175,615 | 10/1939 | Reed et al....................... 228/5 X |
| 2,666,253 | 1/1954 | Morberg....................... 113/1 N X |
| 3,162,942 | 12/1964 | Christman..................... 29/475 X |
| 3,205,583 | 9/1965 | Purbaugh....................... 29/412 X |
| 3,270,404 | 9/1966 | Andreassen......................... 29/160 |
| 3,713,357 | 1/1973 | Keith............................... 83/425 X |

FOREIGN PATENTS OR APPLICATIONS
715,638   9/1954   United Kingdom............... 29/160

Primary Examiner—C. W. Lanham
Assistant Examiner—Victor A. DiPalma
Attorney, Agent, or Firm—Cameron, Kerkam, Sutton, Stowell & Stowell

[57] ABSTRACT

In a plant for the manufacture of floor gratings composed of longitudinal strips standing on edge with respect to the plane of the grating and crossbars welded to said longitudinal strips, each of the strips is conveyed as a continuous length of material from a store of coiled material to a welding station. During the transmit from the store to the welding station, each of the strips is gradually twisted from a flat postion into on-edge position by means of suitable guide means.

5 Claims, 6 Drawing Figures

METHOD AND APPARATUS FOR MANUFACTURE OF FLOOR GRATINGS

BACKGROUND OF THE INVENTION

The invention relates to the manufacture of floor gratings composed of longitudinal strips standing on edge with respect to the plane of the grating and crossbars welded to said longitudinal strips. Such floor gratings are referred to below as "floor gratings of the kind referred to".

In the manufacture of floor gratings of the kind referred to, the longitudinal strips are advanced lengthwise through a welding station in which crossbars are progressively placed across and welded to the longitudinal strips. In existing plants operating on this principle, a steel strip having the same cross-sectional size as the longitudinal strips of the grating is advanced from a coil to a shear by which it is cut into sections of equal lengths. The strip sections are successively deposited on a carriage so as to form an array of parallel strips standing on edge. The carriage is subsequently shifted laterally to a position in front of the welding station to enable the group of strip sections to be advanced into the welding station.

SUMMARY OF THE INVENTION

The invention provides, in the manufacture of floor gratings of the kind referred to, a method of supplying the longitudinal strips to a welding station which comprises the steps of advancing all of the strips jointly as a continuous mat of strips the flat sides of which are parallel to the plane of the mat, during said advancement gradually twisting each of the strips into on-edge position with respect to the plane of the mat, and, feeding the mat of strips standing on edge into the welding station.

The new method according to the invention results in several important advantages. The cutting of the strip material into sections of predetermined length (which has to be equal to, or a multiple of, the length of the finished gratings, in order to avoid loss of material), the deposition of said strip sections on a carriage and the shifting of the carriage to and away from its operative position in front of the welding station are eliminated. The strip material is supplied in a continuous stream to the welding section, the capacity of which can therefore be fully utilized. The strip material may, for instance, be provided as a number of coils equal to the number of strips of the grating to be manufactured, each of said coils containing a strip of the same cross-sectional size as the strips of the grating. In a preferred mode of carrying out the method of the invention, the strip material required is provided in the form of a single coiled sheet or broad strip, which is during its advancement progressively slitted into the number of narrower strips required for the grating.

The invention also provides, in a plant for the manufacture of welded floor gratings of the kind referred to, apparatus for supplying the longitudinal strips to a welding station which comprises means for advancing all of the strips jointly as a continuous mat of strips the flat sides of which are parallel to the plane of the mat, and, guide means for progressively twisting each of the strips into on-edge position with respect to the plane of the mat and for directing the mat of strips standing on edge into the welding station.

DETAILED DESCRIPTION OF THE EMBODIMENTS SHOWN

The floor grating to be manufactured consists of supporting bars 1 and crossbars 2. The supporting bars 1 are steel strips standing on edge with respect to the plane of the grating. The crossbars 2, which usually have a circular or square cross-section, are each joined to the supporting bars by a welding and pressing operation in which the crossbar is forced into the supporting bars to make it lie flush with the supporting bars. For added strength, the grating may be provided with crossbars on both sides. The finished grating is usually provided with an angle-iron or channel-iron frame.

Figure 1A:
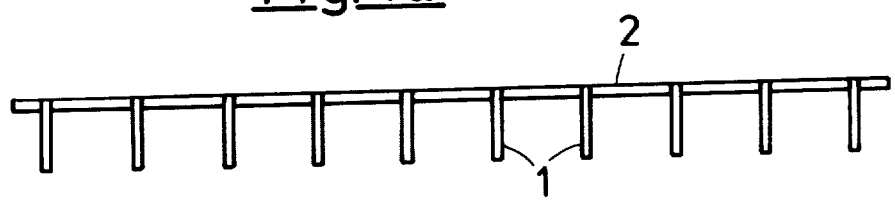
FIGS. 1a and 1b are an end view and a plan view, respectively, of a welded grating.
Figure 1B:
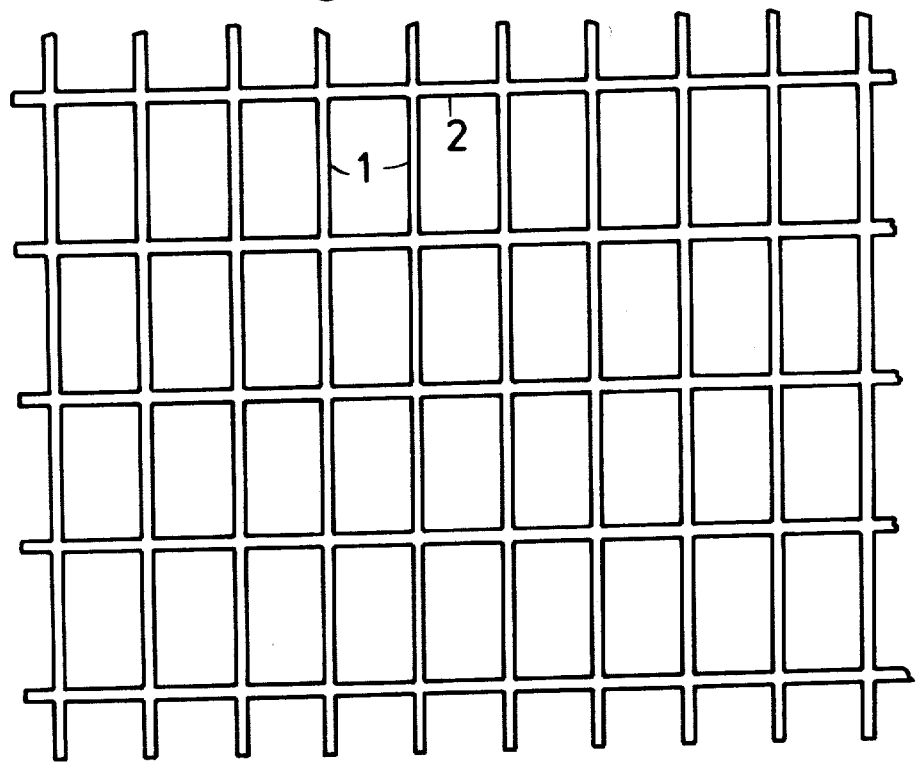
Figure 2:
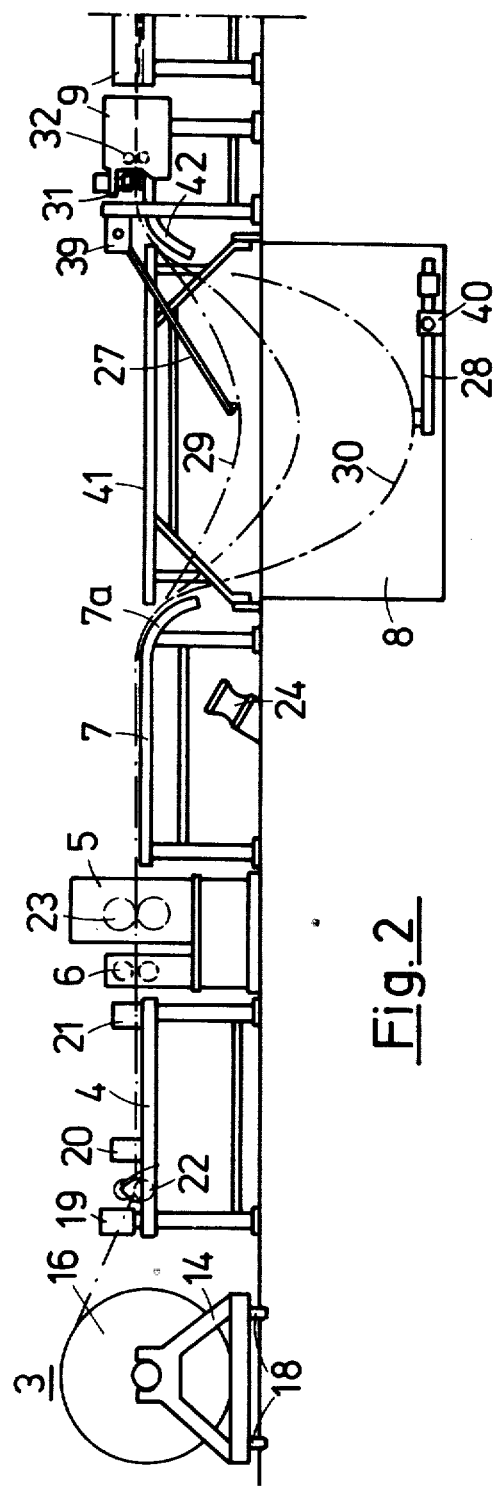
FIG. 2 is a (somewhat schematic) side elevation of a floor grating manufacturing plant in accordance with the invention.
Figure 2:
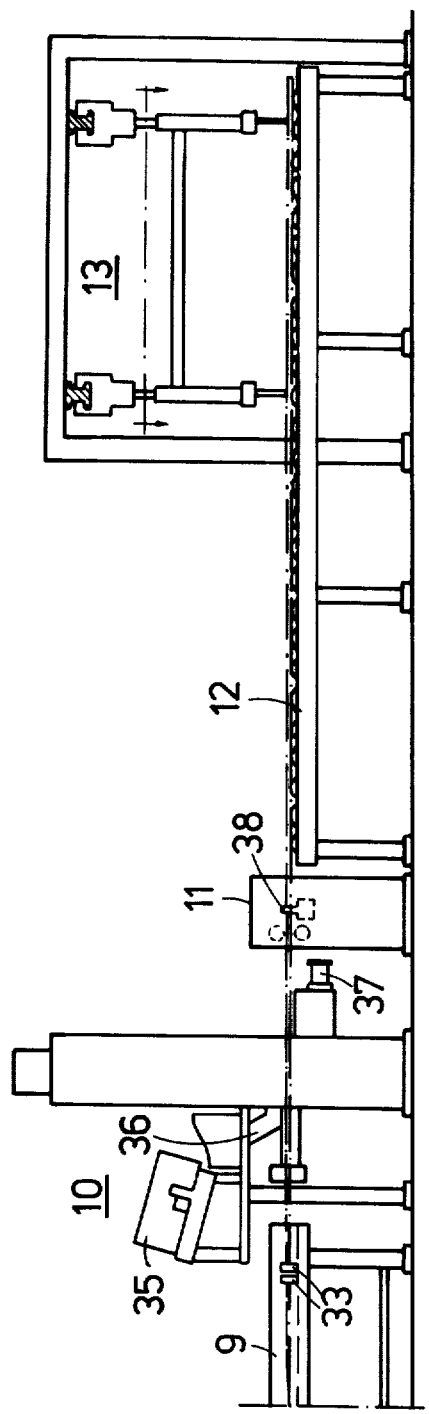
Figure 3:
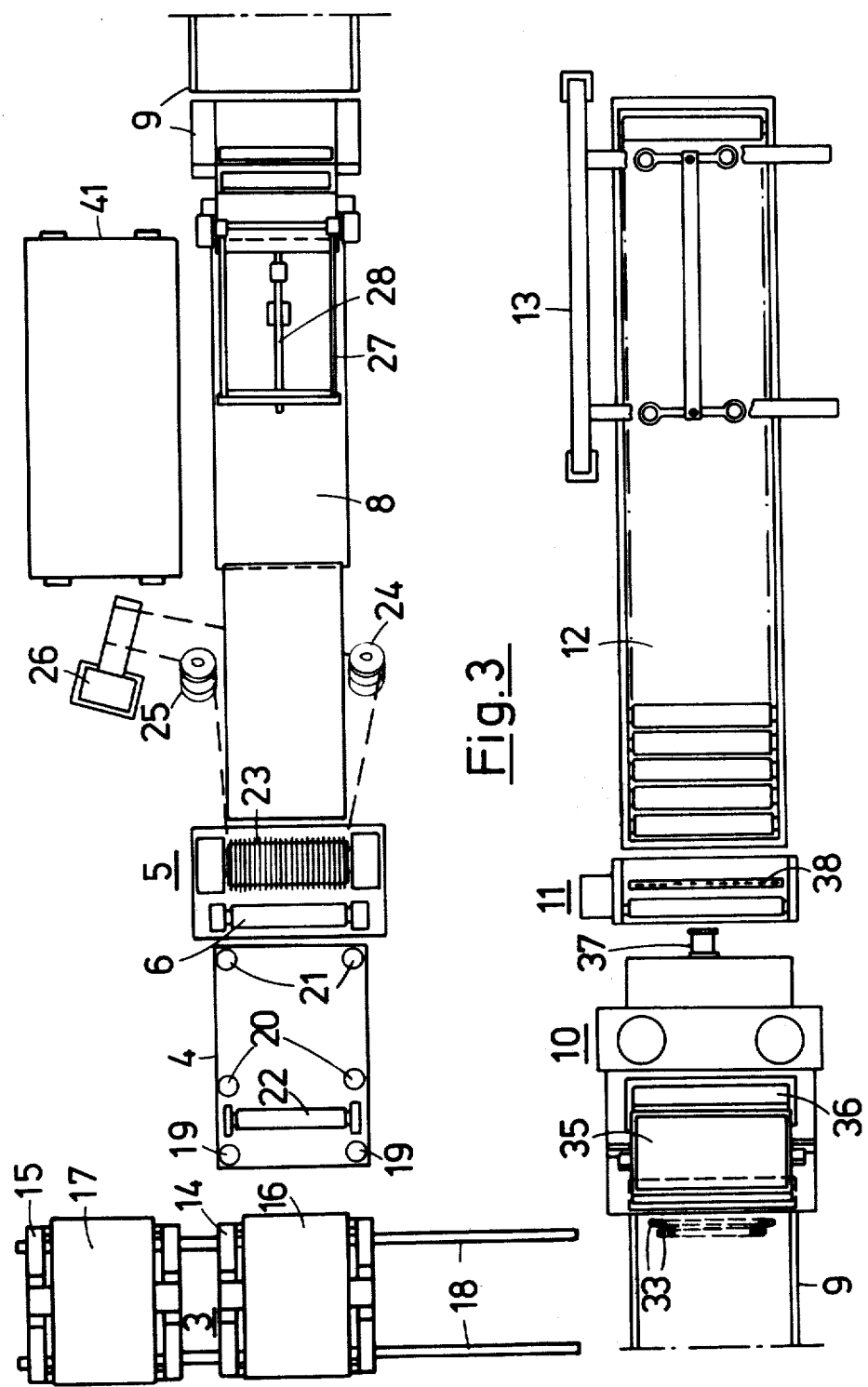
FIG. 3 is a plan view of the plant shown in FIG. 2, and, FIGS. 4a and 4b are an elevation, with some parts shown in section, and a corresponding plan view of certain parts of the plant of FIGS. 1-2, on a larger scale.

The plant represented in FIGS. 2 and 3 comprises a strip material supply station 3, a straightening table 4, a slitting mechanism 5 combined with strip advancing mechanism 6, a delivery table 7, a pit 8, an upending table 9, a welding station 10, a cutting station 11 and a roller table 12 with an overhead crane 13.

The strip material supply station is provided with two carriages 14, 15 movable sideways along a common track 18. Each of the carriages rotatably supports a coil 16, 17, respectively, of sheet or broad strip material having a width slightly exceeding the total width of the strips of grating to be manufactured. Each of the coils is of sufficient size to last during a long period of operation of the plant, preferably several hours or a full working day. As soon as a coil is exhausted, its carriage is shifted sideways along the track 18, and the other carriage supporting a fresh coil is shifted into the operative position.

The advancing mechanism 6 progressively unwinds the sheet or strip of material from the coil 16 and pulls it through a set of guiding and straightening rolls 19, 20, 21 provided on the straightening table 4. A pair of horizontal rolls 22 also provided on the table 4 mainly serve to maintain the sheet of material at the correct level during its passage through the straightener rolls 19, 20, 21. On leaving the advancing mechanism 6, the material enters the slitting mechanism 5 comprising a set of rotary shears 23 slitting the sheet or broad strip into the required number of narrower strips having identical widths and also trimming away the edge portions of the sheet, which are taken up by a scrap reel 26 (FIG. 3), a guide roll 24, 25 being provided to control the transit of each of the edge strips from the shears 23 to the scrap reel. The other strips slide along the delivery table 7 the rear end 7a of which is curved downwards to provide a smooth transition between the part of the strips supported by the table 7 and a strip section bridging the pit 8 between the rear end 7a of the delivery table 7 and a corresponding, curved lip member 42 provided above the other end of the pit 8. The hanging strip section, the length of which can vary between certain limits, serves as a buffer, or interference eliminator, between the strip portion to the left of the pit 8, which is advanced at a constant rate, and the strip portion to the right of the pit 8, which is advanced step by step by the advancement mechanism of the welding station.

Figure 4A:
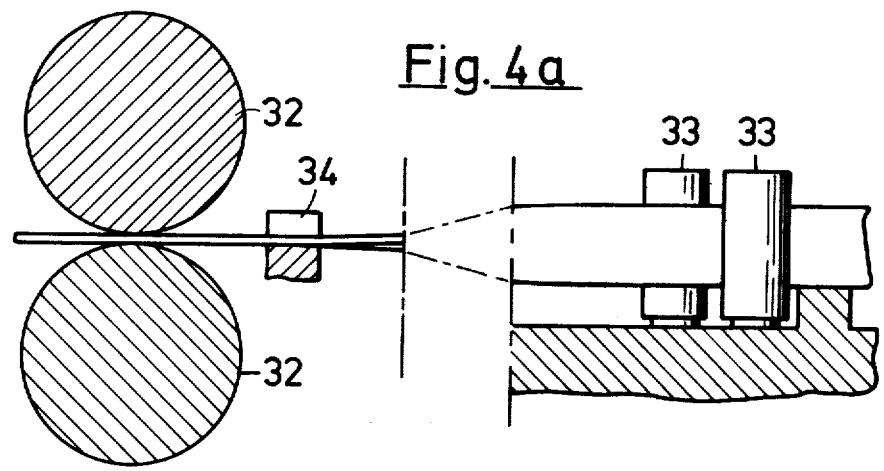
Figure 4B:
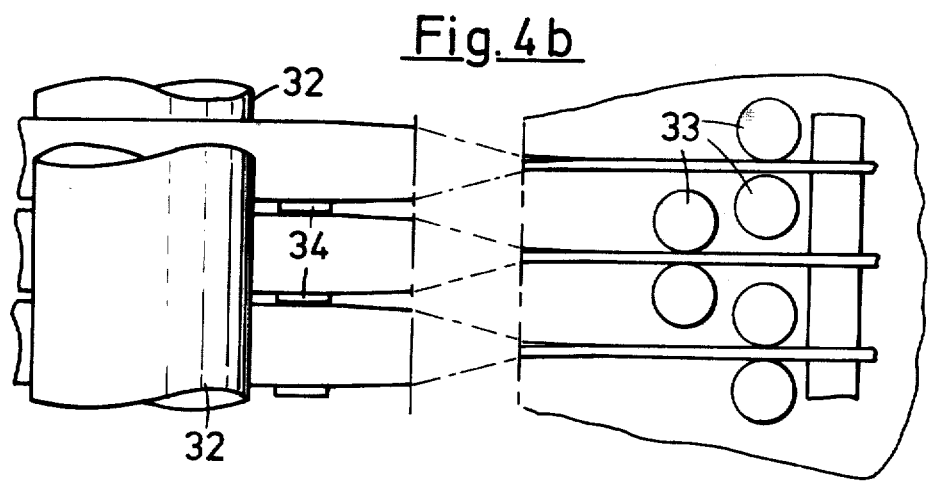

The strips pulled forward from the curved lip 42 under the action of the advancement mechanism of the welding station are engaged first by a pair of brake blocks 31 and, on emerging from between the brake blocks, by a pair of horizontal guide rolls 32. The advancing group of strips here will be seen to constitute a mat, or plane array, the plane of which is parallel to the flat sides of the strips. Distance members 34 (FIGS. 4a, 4b) are provided to keep the strips somewhat apart. During its passage along the upending table 9, each of the strips is progressively twisted through an angle of 90° into on-edge position through the action of a pair of vertical guide rolls 33 (FIGS. 4a, 4b) engaging the flat sides of the strip. The distance between the horizontal guide rolls 32 and the vertical guide rolls 33 is sufficient to ensure that the twisting of the strip will result in no permanent deformation of the same. Consequently, the strip on leaving the guide rolls 33 resumes its plane shape.

The welding station is provided with a store 35 of crossbars cut to the correct length and with means for feeding one cross-bar at a time to the welding locus through a chute 36. Two crossbars at a time are welded to the group of strips. The advancement of the strips and the welded gratings is produced by a pair of pawls operated by a pneumatic cylinder 37 and arranged to engage a crossbar of the welded grating. This mechanism, as well as the arrangement of the welding electrode etc., is well known and requires no further description.

The cutting station 11 is provided with shearing means 38 by means of which the continuous length of grating produced by the welding machine is cut into sections of the desired length. The cut sections are progressively moved to the rear portion of the roller table 12 and removed by means of the overhead crane 13.

As already explained, the strip sections, or loops, hanging above the bottom of the pit 8 serve to absorb the difference between the continuous advancement effected by the advancement mechanism 6 and the step-by-step advancement effected by the welding machine. The length of the loop is subjected not only to a periodic variation corresponding to the cycles of operation of the step-by-step advancing mechanism of the welding machine, but also to variations due to the unavoidable difference between the rate of advancement of the mechanism 6 and the average rate of advancement provided by the welding machine. To ensure that the length of the loops neither drops below a minimum indicated by the line 29 (FIG. 2) nor exceeds a maximum indicated by the line 30, monitoring means 27, 39 and 28, 40, respectively, are arranged to provide a signal when the length of a loop deviates from the range defined by said limits. Each of said monitoring means comprises a feeler member 27, 28, respectively, arranged to be operated by the loop and a signal device 39, 40, respectively, operated by the feeler member. Preferably the signals produced by said signal devices are used to adjust automatically the rate of advancement of the mechanism 6 in such a direction as to cause the length of the loop to be restored to the permissible range. Alternatively, the signals may be caused to operate an alarm device calling the operator's attention to the fact that the rate of advancement of the mechanism 6 requires adjustment.

To facilitate the introductory advancement of material from a fresh coil towards the welding station, a platform 41 which is normally in an inactive position beside the pit 8 (FIG. 3) is shifted to a position above the pit. The upper surface of said platform is flush with, or slightly below, the surface of the delivery table 7. The advancement mechanism 6 can now be used to push the strips forward along the delivery table 7, the platform 41 and the upending table 9 and into the welding machine. As soon as the first pair of crossbars have been welded on, the platform 41 is restored to its inactive position to allow the plant to work in the normal way described.

Alternatively, the fresh sheet and the spent sheet may be joined end-to-end by a welding operation. In that case, the platform 41 will of course be redundant.

While it is preferred to operate the plant with a single coiled sheet or broad strip of material, as described, it is also possible to use a plurality of coils of strip of the size required in the grating, said coils being rotatable about a common, horizontal axis or about individual, horizontal axes. In that case, the cutting station 5 will of course be redundant.

I claim:
1. In the manufacture of floor gratings composed of longitudinal strips standing on edge with respect to the plane of the grating and crossbars welded to said longitudinal strips, the method of supplying the longitudinal strips to a welding station which comprises the steps of
  advancing all of the strips jointly as a continuous mat of strips of the flat sides of which are parallel to the plane of the mat,
  during said advancement gradually twisting each of the strips into on-edge position with respect to the plane of the mat, and,
  feeding the mat of strips standing on edge into the welding station.

2. A method as claimed in claim 1 in which a sheet or broad strip is progressively unwound from a coil and progressively slit into a plurality of strips constituting the continuous mat of strips.

3. A method as claimed in claim 1 in which each of the strips is progressively unwound from an individual coil of strip material.

4. In a plant for the manufacture of welded floor gratings composed of longitudinal strips standing on edge with respect to the plane of the grating and crossbars welded to said longitudinal strips, apparatus for supplying the longitudinal strips to a welding station which comprises
  means for advancing all of the strips jointly as a continuous mat of strips the flat sides of which are parallel to the plane of the mat, and,
  guide means for progressively twisting each of the strips into on-edge position with respect to the plane of the mat and for directing the mat of strips standing on edge into the welding station.

5. Apparatus as claimed in claim 4 comprising a rotatably supported coil of sheet or broad strip material, and shear means for progressively slitting material unwound from said coil into the strips of the continuous mat.

* * * * *